United States Patent [19]

Jeon

[11] Patent Number: 5,761,182
[45] Date of Patent: Jun. 2, 1998

[54] OPTICAL RECORDING AND REPRODUCING APPARATUS

[75] Inventor: Chul-ho Jeon, Kwacheon, Rep. of Korea

[73] Assignee: Samsung Electronics Co., Ltd., Kyungki-do, Rep. of Korea

[21] Appl. No.: 774,498

[22] Filed: Dec. 30, 1996

[30] Foreign Application Priority Data

Jul. 30, 1996 [KR] Rep. of Korea .............. 96-31544

[51] Int. Cl.$^6$ .............. G11B 7/08; G11B 7/09
[52] U.S. Cl. .............. 369/219; 369/244; 369/249; 360/104
[58] Field of Search .............. 369/215, 219, 369/220, 223, 244, 249; 360/104; 310/12

[56] References Cited

U.S. PATENT DOCUMENTS

| | | | |
|---|---|---|---|
| 4,960,321 | 10/1990 | Takahashi | 350/255 |
| 5,111,088 | 5/1992 | Fujino | 310/12 |
| 5,172,367 | 12/1992 | Hinotani | 369/215 |

FOREIGN PATENT DOCUMENTS

| | | |
|---|---|---|
| 1-166336 | 6/1989 | Japan . |
| 1-279430 | 11/1989 | Japan . |
| 2-64511 | 3/1990 | Japan . |
| 2-244431 | 9/1990 | Japan . |
| 2-257431 | 10/1990 | Japan . |
| 3-237624 | 10/1991 | Japan . |
| 3-248315 | 11/1991 | Japan . |
| 6-338151 | 12/1994 | Japan . |
| 7-320275 | 12/1995 | Japan . |

*Primary Examiner*—Stuart S. Levy
*Assistant Examiner*—William J. Klimowicz
*Attorney, Agent, or Firm*—Sughrue, Mion, Zinn, Macpeak & Seas, PLLC

[57] ABSTRACT

An optical recording and reproducing apparatus includes a deck, a turntable disposed on the deck and for loading an optical disc, an optical pickup having through holes, guide shafts inserted into the through holes for slidably guiding the optical pickup, and a plurality of guide shaft holder members rotatably fixed on the deck. Each of the guide shaft holder members has one side where an insertion hole for inserting and supporting an end of a corresponding one of the guide shafts is formed. A plurality of protrusions is formed in each insertion hole for contacting with an external diameter surface of the end of the corresponding guide shaft inserted therein. According to the optical recording and reproducing apparatus, the holder is operative for controlling an angle of the corresponding guide shaft, so that the angle on the horizontal plane of the guide shaft can be easily controlled.

4 Claims, 3 Drawing Sheets

OPTICAL RECORDING AND REPRODUCING APPARATUS

BACKGROUND OF THE INVENTION

The present invention relates to an optical recording and reproducing apparatus and, more particularly, to an optical recording and reproducing apparatus having guide shaft holders in which an installation angle of guide shafts for guiding an optical pickup can easily be adjusted.

The optical recording and reproducing apparatus is a device for reproducing information recorded on an optical recording medium, hereafter called an optical disc, such as a compact disc, a digital video disc or a laser disc. The optical disc, which is loaded on a turntable included in the optical recording and reproducing apparatus, rotates at a predetermined speed, and the optical pickup detects an optical signal from a pit formed in the optical disc.

The optical pickup has a laser semiconductor for lasing, a photo receiving diode for receiving a laser beam reflected from the optical disc, an object lens for focusing the laser beam scattered or diffracted by a track or a mark on a disc surface, and an actuator for focusing and tracking the object lens. The optical pickup rectilinearly moves along the guide shaft in a radial direction over the optical disc. In order to remove or reduce an error of the recording and reproduction, the rectilinear motion of the optical pickup should be precise. Accordingly, the position and the installation angle of the guide shafts during manufacturing of the optical recording and reproducing apparatus should be precisely determined and fixed.

FIG. 1 is a schematic perspective view showing part of a conventional optical recording and reproducing apparatus. The optical recording and reproducing apparatus 10 includes a deck 11, a turntable 12 for loading an optical disc (not shown) thereon, a drive motor 19 for rotating the turntable 12, an optical pickup 15 which rectilinearly reciprocates on the deck 11, an optical pickup drive motor 16 and a screw shaft 18 for converting the rotary motion of the optical pickup drive motor 16 into the rectilinear motion. On one side of the optical pickup 15, a gear surface (not shown) which engages the screw shaft 18 is formed, and the optical pickup 15 is guided along a pair of guide shafts 13 by the rotation of the screw shaft 18.

Furthermore, the optical pickup 15 includes a tracking coil (not shown) and a focusing coil (not shown). The tracking coil performs a function of controllably moving an object lens included in the optical pickup 15 in a radial direction of the optical disc within a predetermined range, and the focusing coil performs a function of controlling a distance between the object lens of the optical pickup 15 and the optical disc surface within a predetermined range.

As shown in FIG. 1, the optical pickup 15 includes through holes 15a where the guide shafts 13 can pass, and the guide shafts 13 are supported on the deck 11 by bearings 14. In order to align the guide shafts 13 with the through holes 15a formed in the optical pickup 15, the position of the bearings 14 fixed on the deck 11 should be accurate. However, in the above bearing supporting structure, a horizontal angle of the guide shaft 13 cannot easily be controlled. That is, when the angle of the guide shafts 13 has a small error due to an error generated during manufacturing and assembly, there is no means for correcting it.

SUMMARY OF THE INVENTION

Accordingly, it is an object of the present invention to provide an optical recording and reproducing apparatus having guide shaft holders which support the guide shafts for guiding an optical pickup and can control an installation angle of the guide shafts.

To accomplish the above object, there is provided an optical recording and reproducing apparatus comprising: a deck; a turntable disposed on the deck and for loading an optical disc thereon; an optical pickup having through holes; guide shafts inserted into the through holes for slidably guiding the optical pickup; a plurality of guide shaft holder members rotatably fixed on the deck and operative to hold the guide shafts, each of the guide shaft holder members having one side where an insertion hole for inserting and supporting an end of a corresponding one of the guide shafts is formed; and a plurality of protrusions formed in each insertion hole for contacting with an external diameter surface of the end of the corresponding guide shaft inserted therein.

It is preferable that each guide shaft holder member has a hexagonal transverse cross-section, with each insertion hole being circular and the protrusions being shaped like a hemisphere and arranged in a corresponding insertion hole at intervals of 90 degrees.

It is further preferable that the diameter of an imaginary circle formed by the apexes of the protrusions corresponds to the external diameter surface of the end of the corresponding guide shaft.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE INVENTION

Figure 1:
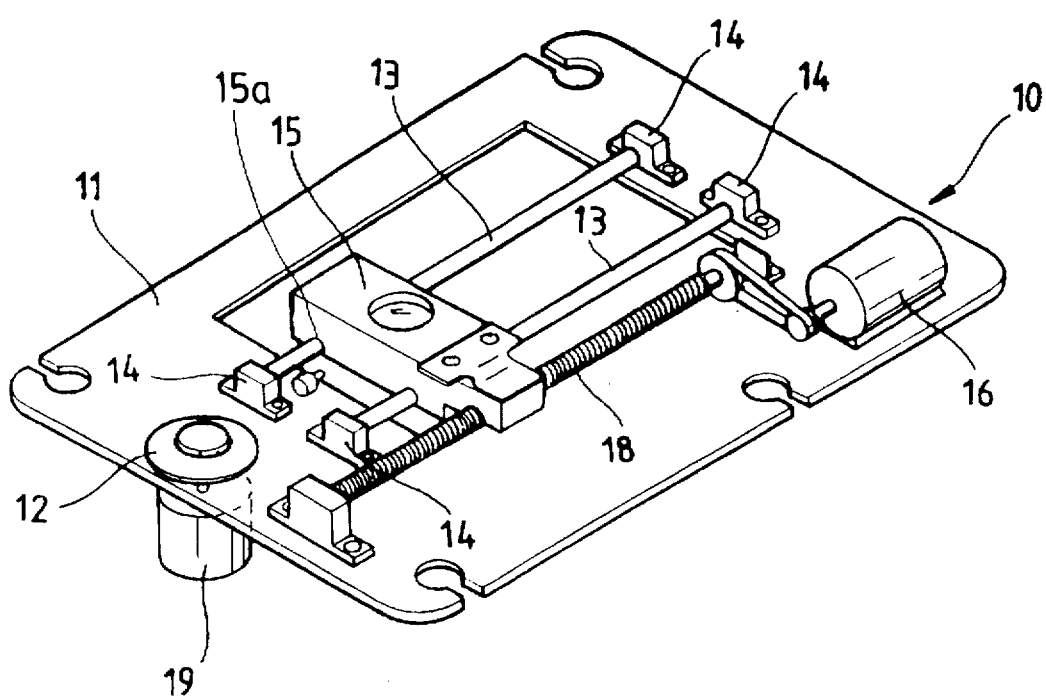
FIG. 1 is a schematic perspective view of a portion of a conventional optical recording and reproducing apparatus.

According to the present invention, the basic structure of an optical recording and reproducing apparatus is similar to that shown in FIG. 1. That is, the optical recording and reproducing apparatus of the present invention has a deck 11, a turntable 12 for loading an optical disc, a drive motor 19 for rotating the turntable 12, an optical pickup 15 for rectilinearly reciprocating on the deck 11, an optical pickup drive motor 16, and a screw shaft 18 for converting the rotary motion of the optical pickup drive motor 16 into rectilinear motion. The optical pickup 15 has a plurality of through holes 15a, and guide shafts 13 inserted into the through holes 15a for guiding the optical pickup 15. However, the guide shafts 13 are supported on the deck 11 by guide shaft holders 21 instead of the bearings 14 (see FIG. 4).

Figure 2:
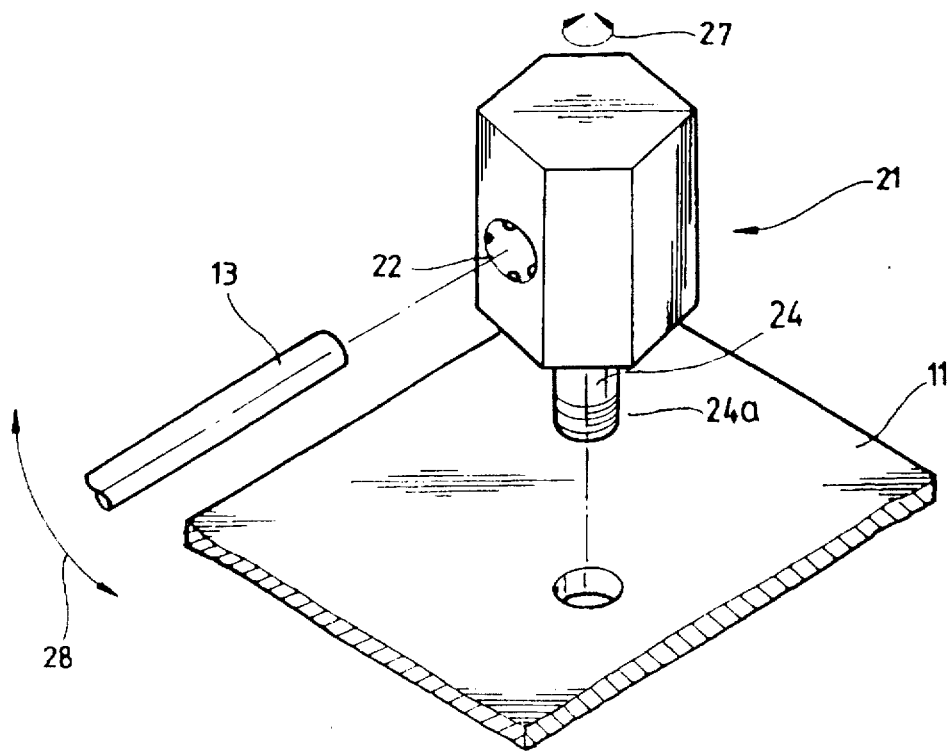
FIG. 2 is a perspective view of a guide shaft holder adopted in an optical recording and reproducing apparatus according to the present invention.

Referring to FIG. 2, wherein components corresponding to those shown in FIG. 1 are designated by the same reference numerals, one of the guide shaft holders 21, which is the characteristic of the present invention, is shown and is shaped in the form of a column having a polygonal or circular transverse cross-section. Further, on one side of the column, an insertion hole 22 for inserting the guide shaft 13 is formed. On the bottom of the guide shaft holder 21, a support shaft 24 is formed. The guide shaft holder 21 is rotatably combined with the deck 11 by the support shaft 24. Preferably, the guide shaft holder 21 is shaped in the form of a hexagonal column.

Figure 3:
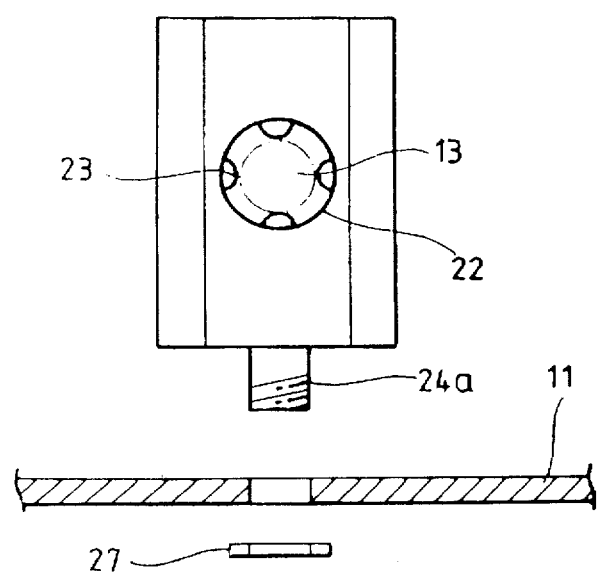
FIG. 3 is a front view of the guide shaft holder shown in FIG. 2.

Referring to FIG. 3, a plurality of protrusions 23 are formed in the insertion hole 22. Preferably, the protrusions 23 are shaped in the form of a hemisphere. A circumference of the guide shaft 13 inserted into the insertion hole 22 contacts and is supported by the apexes of the protrusions 23. Thus, the diameter of an imaginary circle formed by linking the apexes of the protrusions 23 should correspond to an external diameter of the guide shaft 13.

In the embodiment shown, the protrusions 23 are formed in the circular insertion hole 22 at intervals of 90 degrees. Accordingly, the guide shaft 13 is supported on the apexes of the protrusions 23 under the state of point contact. In order for the guide shaft holder 21 to move on the deck 11, for example, a screw thread 24a is formed on an end portion of the support shaft 24, and a nut 27, located at the lower portion of the deck 11, is connected thereto, thereby connecting the guide shaft holder 21 rotatably to the deck 11.

When the misalignment of the angle of the guide shaft 13 on the horizontal plane is detected by separate means while the optical recording and reproducing apparatus is manufactured or repaired, an operator merely rotates the guide shaft holder 21, to thereby correct the improper angle. That is, when the guide shaft holder 21 of FIG. 2 is rotated as indicated by the direction 27, the angle of the guide shaft 13 on the horizontal plane can be corrected, as shown by the direction 28 of FIG. 2. Since the guide shaft 13 is supported on the apexes of the protrusions 23, the guide shaft holder 21 can move without generating a bending movement with respect to the guide shaft 13, as long as the guide shaft holder 21 rotates within a small angle.

Figure 4:
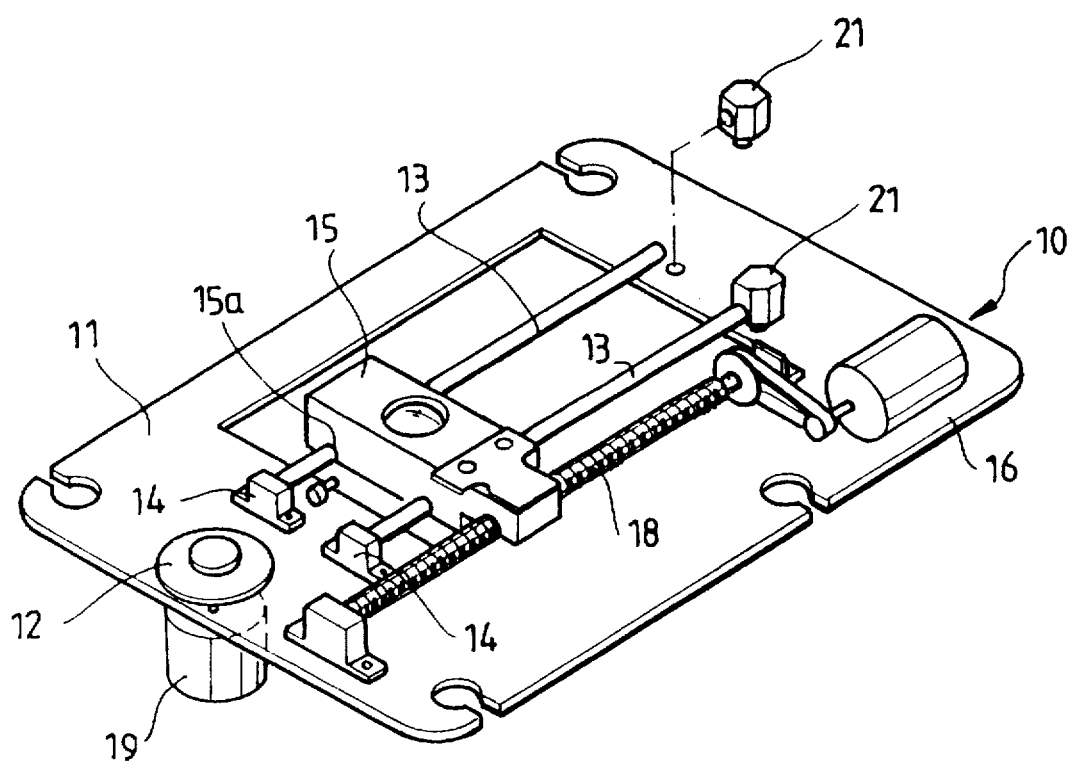
FIG. 4 is a schematic perspective view of a portion of the optical recording and reproducing apparatus according to the present invention.

Referring to FIG. 4, the guide shaft holders 21 are respectively inserted through the holes formed on the deck 11. In the same manner as described previously, the guide shaft holders 21 support and control the installation angle of the guide shafts 13.

According to an optical recording and reproducing apparatus of the present invention which has a holder for controlling an installation angle of the guide shaft, an angle on the horizontal plane of the guide shaft can be easily controlled. Thus, the optical pickup can be accurately guided.

It should be understood that the invention is not limited to the illustrated embodiment and that many changes and modifications can be made within the scope of the invention by a person skilled in the art. That is, according to the embodiment, a circular insertion hole is formed on one side of the hexagonal column and hemispherical shaped protrusions are positioned at intervals of 90 degrees. However, three protrusions can be positioned at intervals of 120 degrees or a tetragonal shaped column instead of the hexagonal shaped column can be used.

What is claimed is:

1. An optical recording and reproducing apparatus comprising:

a deck;

a turntable disposed on said deck and for loading an optical disc thereon;

an optical pickup having through holes;

guide shafts inserted into said through holes for slidably guiding said optical pickup;

a plurality of guide shaft holder members rotatably fixed on said deck about a horizontal plane parallel to the recording surface of the optical disc mounted on said turntable and operative to hold said guide shafts, each of said guide shaft holder members having one side where an insertion hole for inserting and supporting an end of a corresponding one of said guide shafts is formed; and a plurality of protrusions formed in each said insertion hole for contacting with an external diameter surface of the end of the corresponding said guide shaft inserted therein.

2. The optical recording and reproducing apparatus according to claim 1, wherein each of said guide shaft holder members has a hexagonal transverse cross-section, with each said insertion hole being circular and said protrusions being shaped like a hemisphere and arranged in a corresponding said insertion hole at intervals of 90 degrees.

3. The optical recording and reproducing apparatus according to claim 2, wherein a diameter of an imaginary circle formed by apexes of said protrusions corresponds to the external diameter surface of the end of the corresponding said guide shaft.

4. The optical recording and reproducing apparatus according to claim 1, wherein a diameter of an imaginary circle formed by apexes of said protrusions corresponds to the external diameter surface of the end of the corresponding said guide shaft.

\* \* \* \* \*